United States Patent
Dozen et al.

(10) Patent No.: US 11,586,395 B2
(45) Date of Patent: Feb. 21, 2023

(54) PRINT JOB TRANSMISSION DEVICE AND COMPUTER READABLE NON-TRANSITORY RECORDING MEDIUM STORING A PRINT JOB TRANSMISSION PROGRAM

(71) Applicant: KYOCERA Document Solutions Inc., Osaka (JP)

(72) Inventors: Kazuki Dozen, Osaka (JP); Takanori Miyamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/386,802

(22) Filed: Jul. 28, 2021

(65) Prior Publication Data
US 2022/0043612 A1 Feb. 10, 2022

(30) Foreign Application Priority Data
Aug. 4, 2020 (JP) .............................. JP2020-132467

(51) Int. Cl.
*G06F 3/12* (2006.01)

(52) U.S. Cl.
CPC .......... *G06F 3/1205* (2013.01); *G06F 3/1253* (2013.01); *G06F 3/1286* (2013.01)

(58) Field of Classification Search
CPC combination set(s) only.
See application file for complete search history.

(56) References Cited

U.S. PATENT DOCUMENTS

| | | | |
|---|---|---|---|
| 10,423,367 B1* | 9/2019 | Yamamoto | G06F 3/126 |
| 2006/0279780 A1* | 12/2006 | Anno | G06F 3/1263 358/1.15 |
| 2008/0244618 A1* | 10/2008 | Kudo | H04N 1/00204 719/318 |
| 2009/0089355 A1* | 4/2009 | Kudo | G06K 15/02 709/201 |
| 2009/0195825 A1* | 8/2009 | Kudo | G06F 3/1285 358/1.15 |
| 2011/0222112 A1* | 9/2011 | Yagi | H04N 1/4413 358/1.15 |
| 2011/0222113 A1* | 9/2011 | Adachi | H04N 1/32128 358/1.15 |
| 2012/0062942 A1* | 3/2012 | Ohta | G06F 3/1206 358/1.15 |
| 2014/0139876 A1* | 5/2014 | Kadota | G06F 3/1209 358/1.15 |
| 2014/0293362 A1* | 10/2014 | Kawakami | H04N 1/2166 358/403 |
| 2017/0116871 A1* | 4/2017 | Castelli | G09B 7/00 |
| 2017/0371533 A1* | 12/2017 | Banguero | G06F 3/0483 |
| 2018/0285031 A1* | 10/2018 | Dalvi | G06F 3/1206 |

(Continued)

FOREIGN PATENT DOCUMENTS

JP 2006-293554 10/2006

*Primary Examiner* — Helen Zong
(74) *Attorney, Agent, or Firm* — Lex IP Meister, PLLC

(57) ABSTRACT

A print job transmission device includes a print job generator to generate a print job on a basis of a PDF file that exists under a hot folder, and a print job transmitter to transmit the print job generated by the print job generator. The print job transmitter obtains an IP address and a port number of a destination of the print job based on the PDF file from a folder name of the hot folder in an upper hierarchy of this PDF file, on a basis of a specific rule.

6 Claims, 13 Drawing Sheets

(56) References Cited

U.S. PATENT DOCUMENTS

2020/0272394 A1\* 8/2020 Kubota ................... G06F 3/122
2021/0157538 A1\* 5/2021 Nakamura ............ G06F 3/1288
2021/0319558 A1\* 10/2021 Min ...................... G06T 7/0012

\* cited by examiner

FIG. 12A

| COLOR SETTING | MONOCHROME |
|---|---|
| DOUBLE-SIDED SETTING | DOUBLE-SIDED |
| FINISHER SETTING | OFF |
| Hold SETTING | OFF |

FIG. 12B

| COLOR SETTING | COLOR |
|---|---|
| DOUBLE-SIDED SETTING | DOUBLE-SIDED |
| FINISHER SETTING | OFF |

FIG. 12C

| DOUBLE-SIDED SETTING | SINGLE-SIDED |
|---|---|

FIG. 12D

| FINISHER SETTING | ON |
|---|---|

FIG. 13A

| COLOR SETTING | COLOR |
|---|---|
| DOUBLE-SIDED SETTING | DOUBLE-SIDED |
| FINISHER SETTING | ON |
| Hold SETTING | ON |

FIG. 13B

| COLOR SETTING | COLOR |
|---|---|
| DOUBLE-SIDED SETTING | SINGLE-SIDED |
| FINISHER SETTING | OFF |
| Hold SETTING | OFF |

# PRINT JOB TRANSMISSION DEVICE AND COMPUTER READABLE NON-TRANSITORY RECORDING MEDIUM STORING A PRINT JOB TRANSMISSION PROGRAM

INCORPORATION BY REFERENCE

This application is based upon, and claims the benefit of priority from, corresponding Japanese Patent Application No. 2020-132467 filed in the Japan Patent Office on Aug. 4, 2020, the entire contents of which are incorporated herein by reference.

BACKGROUND

Field of the Invention

The present disclosure relates to a print job transmission device that transmits a print job and a computer-readable non-transitory recording medium storing a print job transmission program.

Description of Related Art

Typically, an image forming system is known that has an image forming apparatus that performs printing and a print job transmission device that transmits a print job to the image forming apparatus. This print job transmission device includes a hot folder, and when a file with a specific file format is placed in the hot folder, a print job based on the file is transmitted to an image forming apparatus associated with the hot folder.

SUMMARY

The print job transmission device according the present disclosure includes a print job generator to generate a print job on a basis of a specific format file as a file with a specific file format that exists under a hot folder, and a print job transmitter to transmit the print job generated by the print job generator. The print job transmitter obtains an IP address and a port number of a destination of the print job based on the specific format file from a folder name of the hot folder in an upper hierarchy of the specific format file, on a basis of a specific rule.

A computer readable non-transitory recording medium according to the present disclosure stores a print job transmission program. The print job transmission print job transmission program according the present disclosure causes a computer to implement a print job generator to generate a print job on a basis of a specific format file as a file with a specific file format that exists under a hot folder, and a print job transmitter to transmit the print job generated by the print job generator. The print job transmitter obtains an IP address and a port number of a destination of the print job based on the specific format file from a folder name of the hot folder in an upper hierarchy of the specific format file, on a basis of a specific rule.

BRIEF DESCRIPTION OF THE DRAWINGS

FIG. 12A is a table illustrating an example of a job setting initial value indicated in job setting initial value information illustrated in FIG. 3. FIG. 12B is a table illustrating an example of a job setting indicated in a job setting file with a file name "jt.xjdf" directly under a hot folder with a folder name "11.111.11.111_80" illustrated in FIG. 8. FIG. 12C is a table illustrating an example of a job setting indicated in a job setting file with a file name "jt.xjdf" directly under a directory with a name of "FOR POSTER PRINTING" illustrated in FIG. 8. FIG. 12D is a table illustrating an example of a job setting indicated in a job setting file with a file name "jt.xjdf" directly under a Hold directory illustrated in FIG. 8; and FIG. 13A is a table illustrating an example of a job setting determined in S144 illustrated in FIG. 10. FIG. 13B is a table illustrating an example of a job setting determined in S147 illustrated in FIG. 11.

DETAILED DESCRIPTION

The following describes an embodiment of the present disclosure with the use of the accompanying drawings.

First, an image forming system according to one embodiment of the disclosure will be described.

Figure 1:
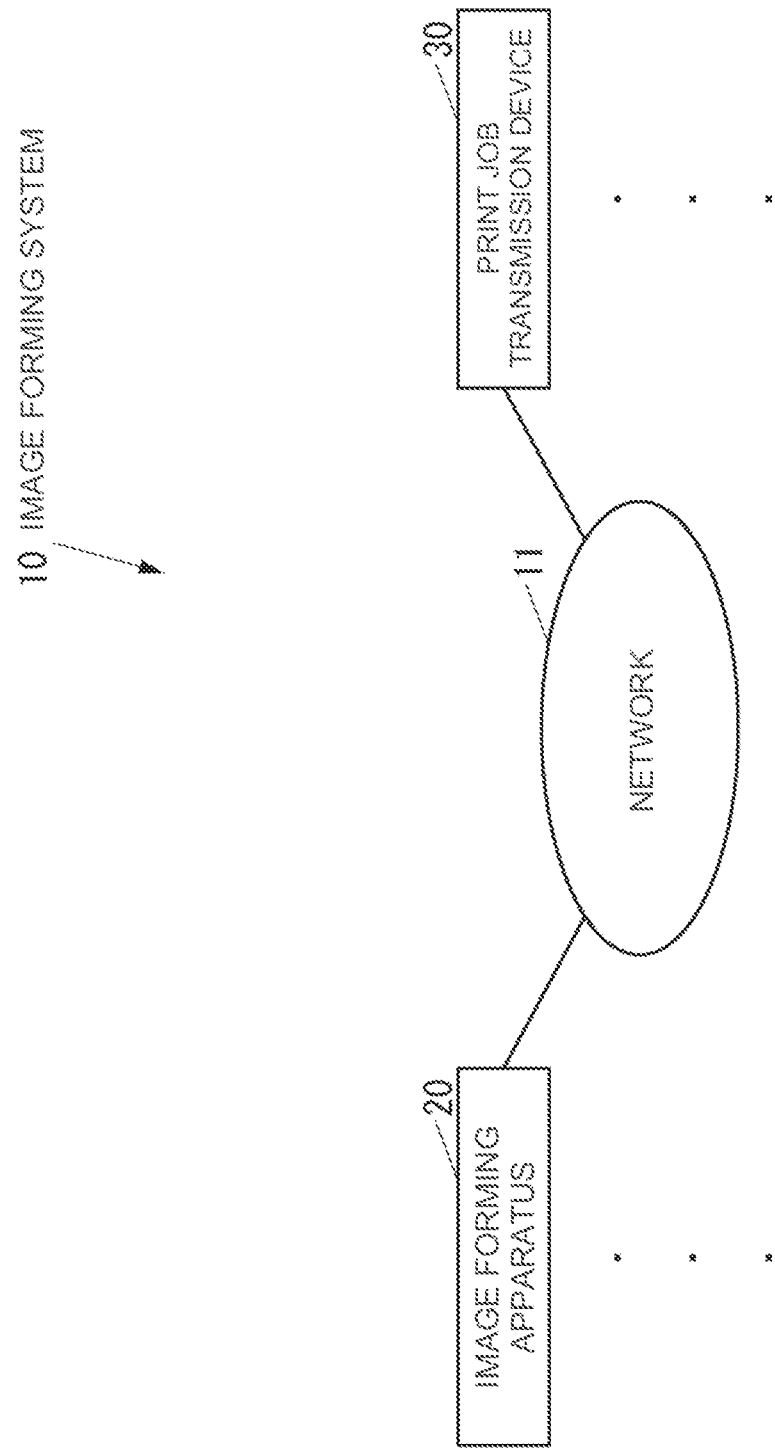
FIG. 1 is a block diagram of an image forming system according to one embodiment of the present disclosure.

FIG. 1 is a block diagram of an image forming system 10 according to the present embodiment.

As illustrated in FIG. 1, the image forming system 10 includes an image forming apparatus 20 to execute printing. The image forming system 10 can include at least one image forming apparatus having a similar configuration as that of the image forming apparatus 20, other than the image forming apparatus 20. The image forming apparatus includes, for example, an MFP (Multifunction Peripheral), a production printer, and the like.

The image forming system 10 includes a print job transmission device 30 as a computer to transmit a print job to the image forming apparatus 20. The image forming system 10 can include at least one print job transmission device having a similar configuration as that of the print job transmission device 30, other than the print job transmission device 30. The print job transmission device 30 includes, for example, a personal computer (PC).

The image forming apparatus in the image forming system 10 and the print job transmission device in the image forming system 10 can communicate to each other, for example, via a network 11 such as a local area network (LAN) or the Internet.

Figure 2:
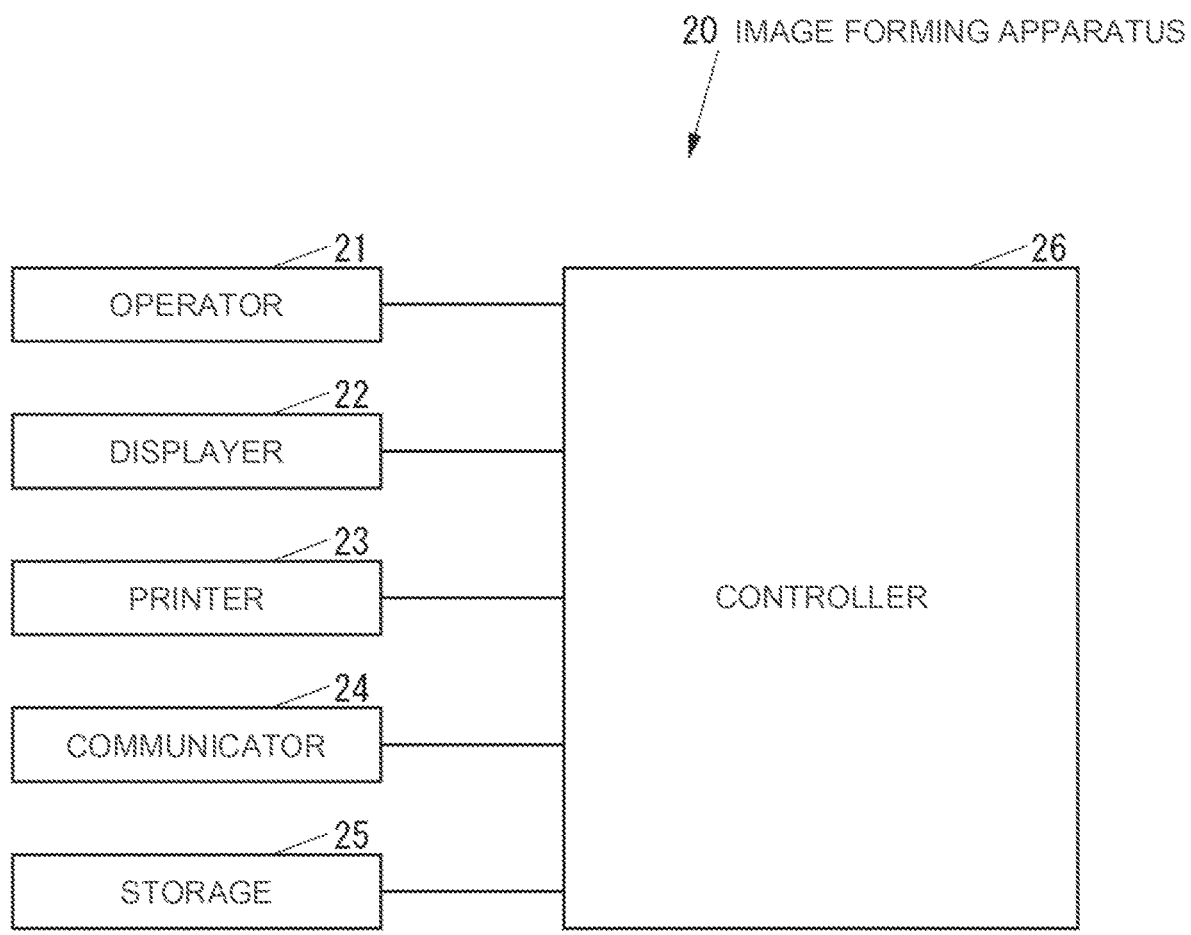
FIG. 2 is a block diagram of an image forming apparatus illustrated in FIG. 1.

FIG. 2 is a block diagram of the image forming apparatus 20.

As illustrated in FIG. 2, the image forming apparatus 20 includes an operator 21 that is an operation device such as a button with which various operations are input, a displayer 22 that is a display device such as a liquid crystal display (LCD) to display various information, a printer 23 that is a printing device to print an image on a recording medium such as a paper, a communicator 24 that is a communication device to communicate directly with external devices via a network such as a LAN or the Internet or by wire or wirelessly without the network, a storage 25 that is a non-volatile storage device such as a semiconductor memory or a hard disk drive (HDD) to store various information, and a controller 26 to control the entire image forming apparatus 20.

The controller 26 includes, for example, a CPU (Central Processing Unit), a ROM (Read Only Memory) that stores programs and various kinds of data, and a RAM (Random Access Memory) as a memory used for the work area of the CPU of the controller 26. The CPU of the controller 26 executes the program stored in the storage 25 or the ROM of the controller 26.

Figure 3:
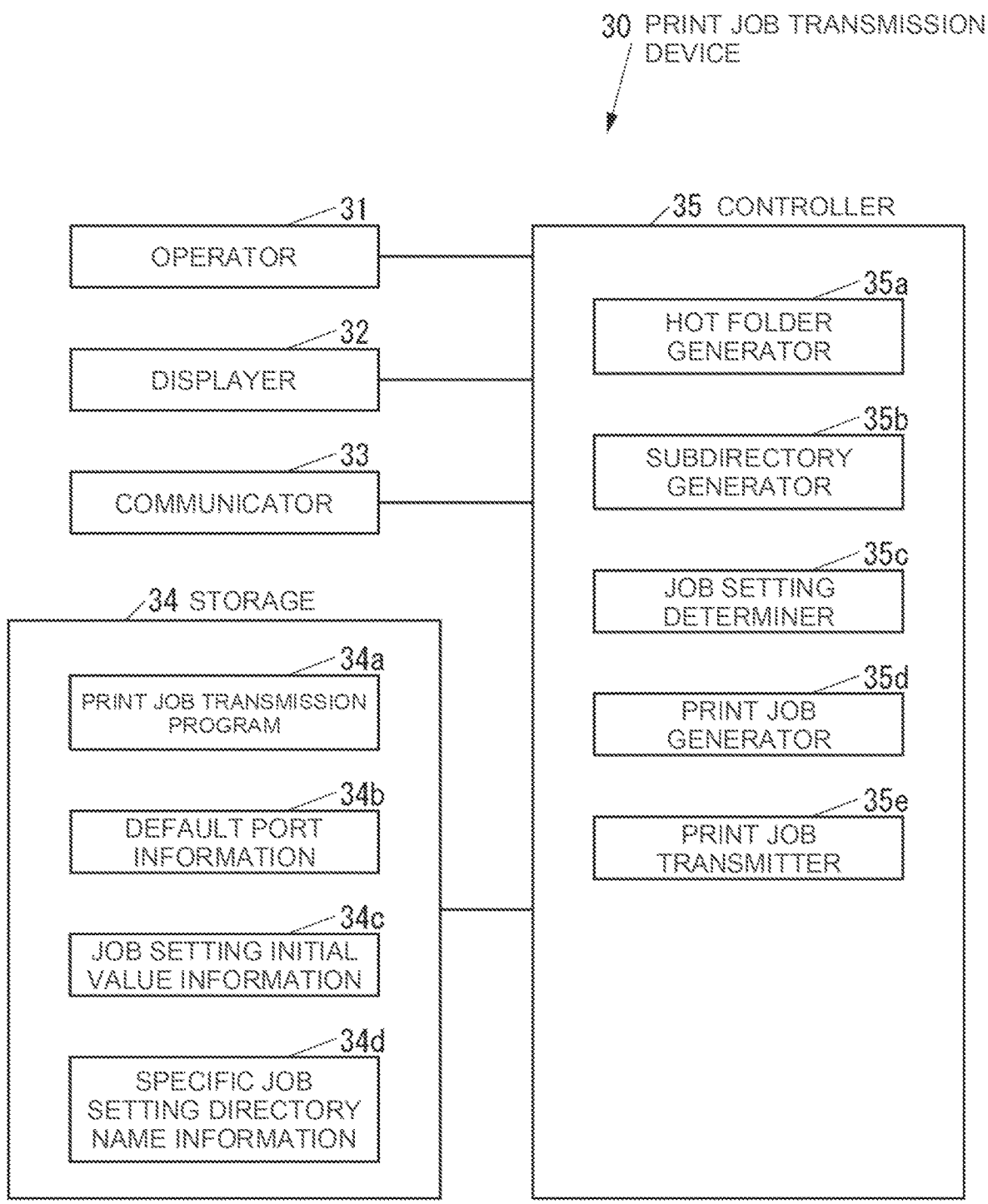
FIG. 3 is a block diagram of a print job transmission device illustrated in FIG. 1.

FIG. 3 is a block diagram of the print job transmission device 30.

As illustrated in FIG. 3, the print job transmission device 30 includes an operator 31 that is an operation device such as a keyboard and a mouse with which various operations are input, a displayer 32 that is a display device such as an LCD to display various information, a communicator 33 that is a communication device to communicate directly with external devices via a network such as a LAN or the Internet or by wire or wirelessly without the network, a storage 34 that is a non-volatile storage device such as a semiconductor memory or a hard disk drive (HDD) to store various information, and a controller 35 to control the entire print job transmission device 30.

The storage 34 stores a print job transmission program 34*a* for transmitting a print job. The print job transmission program 34*a* may be installed in the print job transmission devices 30, for example, at the manufacturing stage of the print job transmission device 30, may be additionally installed in the print job transmission device 30 from an external storage medium such as a compact disk (CD), a digital versatile disk (DVD), or a USB (Universal Serial Bus) memory, or may be additionally installed in the print job transmission device 30 from a network. The print job transmission program 34*a* is a utility tool for operating a document management server (not illustrated) installed in the print job transmission device 30.

The storage 34 stores default port information 34*b* that indicates a default port number used for communication with the image forming apparatus. For example, by executing the print job transmission program 34*a*, the controller 35 can update the content of the default port information 34*b* in accordance with an instruction input from the operator 31.

The storage 34 stores job setting initial value information 34*c* that indicates the initial value of a job setting as a print job setting. For example, by executing the print job transmission program 34*a*, the controller 35 can update the content of the job setting initial value information 34*c* in accordance with an instruction input from the operator 31.

The storage 34 stores specific job setting directory name information 34*d* that indicates the correspondence relation between a specific job setting and the name of a directory for setting this job (hereinafter referred to as a "specific job setting directory"). For example, by executing the print job transmission program 34*a*, the controller 35 can update the content of the specific job setting directory name information 34*d* in accordance with an instruction input from the operator 31.

The specific job setting directory includes, for example, a Hold directory for a Hold setting, which is a job setting that causes the image forming apparatus to wait for the execution of printing according to a print job when the print job is received by the image forming apparatus. For example, when a plurality of print jobs to which the Hold setting is applied are accumulated in the image forming apparatus, the user of the print job transmission device 30 can instruct the image forming apparatus to execute these print jobs via the print job transmission program 34*a* and thus can cause the image forming apparatus to execute these print jobs all at once.

In addition, there are also directories other than the Hold directory in the specific job setting directory. For example, the specific job setting directory includes a directory for job settings that allow the image forming apparatus to perform color printing and a directory for job settings that allow the image forming apparatus to perform monochrome printing.

The controller 35 includes, for example, a CPU, a ROM storing a program and various data, and a RAM as a memory applied as a workspace of the CPU of the controller 35. The CPU of the controller 35 executes the program stored in the storage 34 or the ROM of the controller 35.

By executing the print job transmission program 34*a*, the controller 35 implements a hot folder generator 35*a* that generates a hot folder, a subdirectory generator 35*b* that generates a subdirectory of the hot folder, and a job setting determiner 35*c* that determines a job setting to be applied to a print job, a print job generator 35*d* that generates a print job on the basis of a PDF (Portable Document Form) file as a specific format file that exists under the hot folder, and a print job transmitter 35*e* that transmits the print job generated by the print job generator 35*d*.

Next, the operation of the image forming system 10 will be described.

First, the operation of the print job transmission device 30 when the print job transmission program 34*a* is started will be described.

The user of the print job transmission device 30 can instruct the print job transmission device 30 to start the print job transmission program 34*a* from the operator 31. When instructed to start the print job transmission program 34*a*, the controller 35 of the print job transmission device 30 starts the print job transmission program 34*a*. When the print job transmission program 34*a* is started, the print job generator 35*d* starts monitoring the hot folder directly under the root directory of the hot folder.

In the following description, an example of the path of the root directory of the hot folder is "C:¥ProgramData¥AAA¥Print Job Manager¥HotFolder".

Next, the operation of the print job transmission device 30 when a hot folder is generated will be described.

Figure 4:
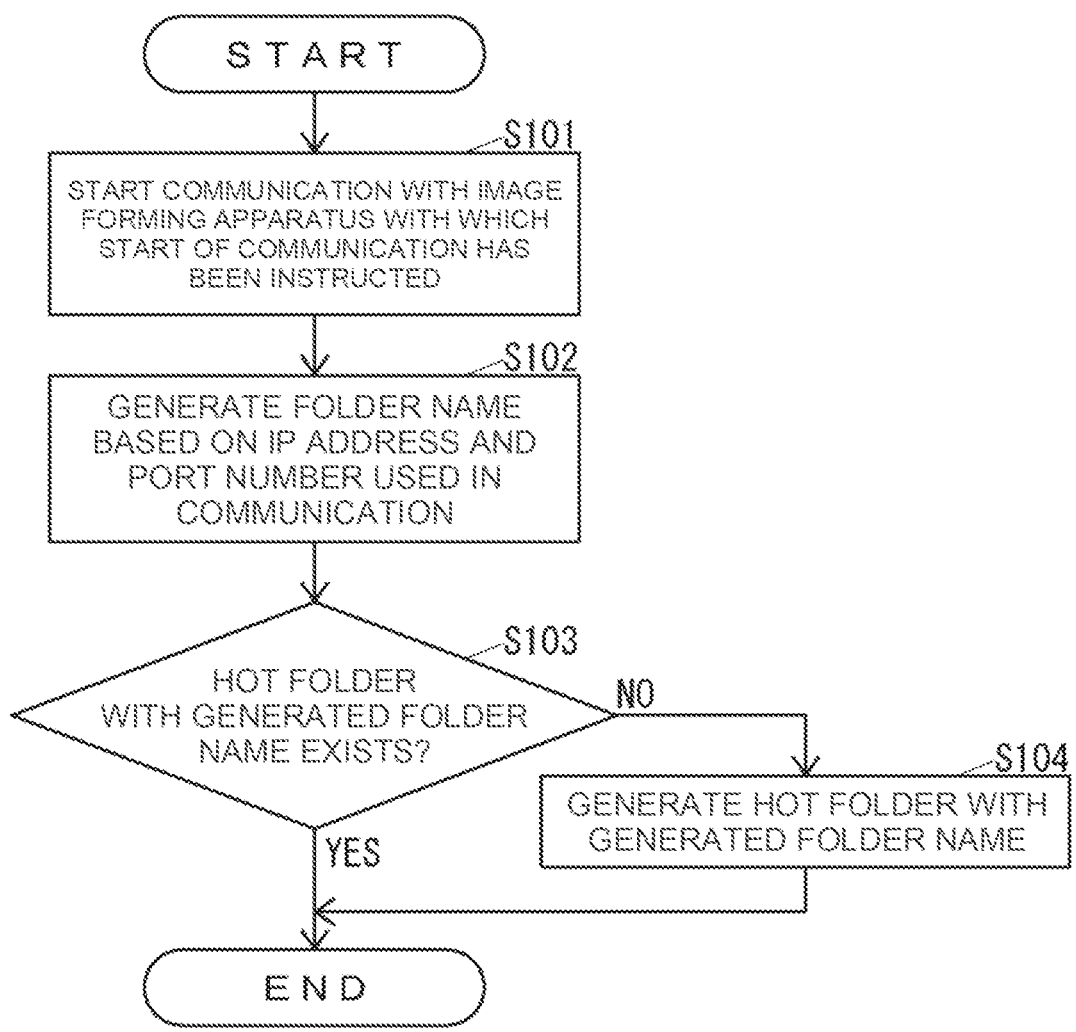
FIG. 4 is a flowchart of an operation of the print job transmission device illustrated in FIG. 3 when a hot folder is generated.

FIG. 4 is a flowchart of an operation of the print job transmission device 30 when a hot folder is generated.

In a state where the print job transmission program 34*a* is running, the user of the print job transmission device 30 can instruct the print job transmission device 30 from the operator 31 to start communication with an image forming apparatus by specifying an IP (Internet Protocol) address of the image forming apparatus. In this instruction, not only the IP address but also the port number of the image forming apparatus to be the communication partner may be specified. When instructed to start communication with the image forming apparatus, the controller 35 of the print job transmission device 30 executes the operation illustrated in FIG. 4.

As illustrated in FIG. 4, the print job transmitter 35e starts communication with the image forming apparatus with which the start of communication is instructed (S101). Here, if both the IP address and the port number are specified in the instruction for starting communication with the image forming apparatus, the print job transmitter 35e starts communication with the image forming apparatus with the use of both the specified IP address and the port number. If only the IP address among the IP address and the port number is specified in the instruction for starting communication with the image forming apparatus, the print job transmitter 35e starts communication with the image forming apparatus with the use of the specified IP address and the default port number indicated in the default port information 34b.

After the processing of S101, the hot folder generator 35a generates a folder name based on the IP address and port number used in the communication with the image forming apparatus in S101, in accordance with a specific rule (S102). Here, the specific rule is the creation rule of the folder in the document management server described above, for example, the rule "IP address_port number". For example, when the IP address and the port number used in the communication with the image forming apparatus in S101 are "11.111.11.111" and "80", respectively, the hot folder generator 35a generates a folder name "11.111.11.111_80" in S102. In addition, when the IP address and the port number used in the communication with the image forming apparatus in S101 are "22.222.22.222" and "443", respectively, the hot folder generator 35a generates a folder name "22.222.22.222_443" in S102.

Next, the hot folder generator 35a determines whether a hot folder with the folder name generated in S102 exists directly under the root directory of the hot folder (S103).

When determining in S103 that there is no hot folder with the folder name generated in S102 directly under the root directory of the hot folder, the hot folder generator 35a generates a hot folder with the folder name generated in S102 directly under the root directory of the hot folder (S104). The hot folder generator 35a may generate, in S104, a Success folder for storing a file that has been successfully printed and a False folder for storing a file that has failed to be printed, directly under the hot folder generated in S104.

The hot folder generator 35a ends the operation illustrated in FIG. 4 when determining in S103 that a hot folder with the folder name generated in S102 exists directly under the root directory of the hot folder, or when the processing of S104 is completed.

Figure 5:
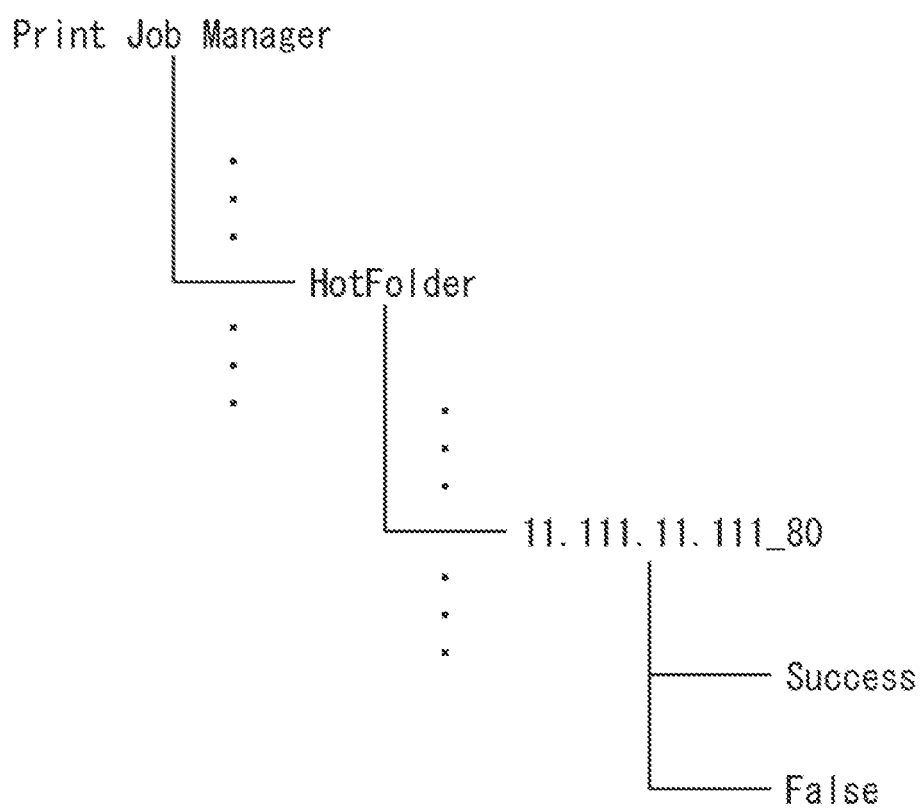
FIG. 5 is a diagram illustrating an example of a hot folder that is generated by the operation illustrated in FIG. 4.

FIG. 5 is a diagram illustrating an example of the hot folder that is generated by the operation illustrated in FIG. 4.

In FIG. 5, "Print Job Manager" indicates a directory with a path "C:¥ProgramData¥AAA¥Print Job Manager". In a case where the folder name generated in S102 is "11.111.11.111_80", when determining in S103 that there is no hot folder with the folder name generated in S102 directly under the root directory of the hot folder, the hot folder generator 35a generates a hot folder with the path "C:¥ProgramData¥AAA¥Print Job Manager¥HotFolder¥11.111.11.111_80" in S104 as illustrated in FIG. 5.

Next, the operation of the print job transmission device 30 when the specific job setting directory is generated will be described.

In a state where the print job transmission program 34a is running, the user of the print job transmission device 30 can instruct the print job transmission device 30 from the operator 31 to generate a specific job setting directory under a specific hot folder. When instructed to generate a specific job setting directory under a specific hot folder, the subdirectory generator 35b of the print job transmission device 30 generates this specific job setting directory at the instructed location. Here, any of the names indicated in the specific job setting directory name information 34d is specified as the name of the specific job setting directory.

Figure 6:
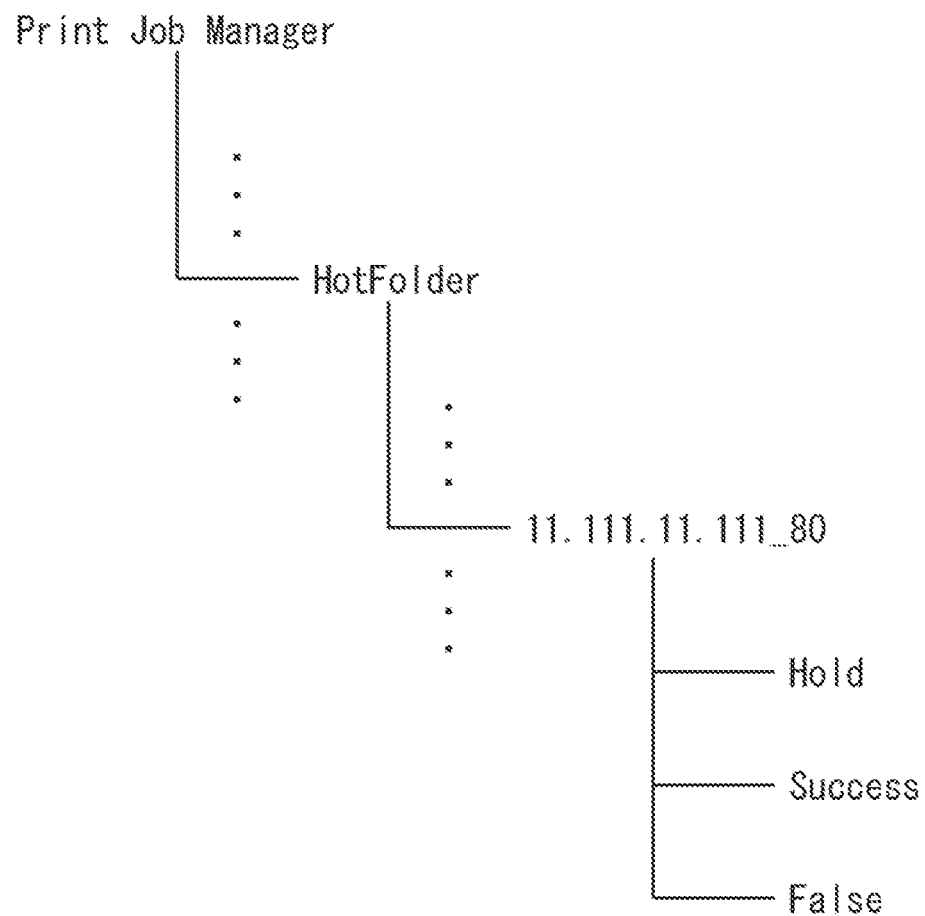
FIG. 6 is a diagram illustrating an example of a specific job setting directory generated directly under the hot folder illustrated in FIG. 5.

FIG. 6 is a diagram illustrating an example of a specific job setting directory generated directly under the hot folder illustrated in FIG. 5.

In FIG. 6, a Hold directory is generated as a specific job setting directory directly under a hot folder with a folder name "11.111.11.111_80".

Next, the operation of the print job transmission device 30 when a directory other than the specific job setting directory (hereinafter, referred to as a "normal directory") is generated will be described.

In a state where the print job transmission program 34a is running, the user of the print job transmission device 30 can instruct the print job transmission device 30 from the operator 31 to generate a normal directory under a specific hot folder. When instructed to generate a normal directory under a specific hot folder, the subdirectory generator 35b of the print job transmission device 30 generates this normal directory at the instructed location.

The subdirectory generator 35b of the print job transmission device 30 can be instructed to generate a normal directory directly under a specific hot folder, can be instructed to generate a normal directory directly under a specific job setting directory under a specific hot folder, or can be instructed to generate a normal directory directly under a normal directory under a specific hot folder.

Figure 7:
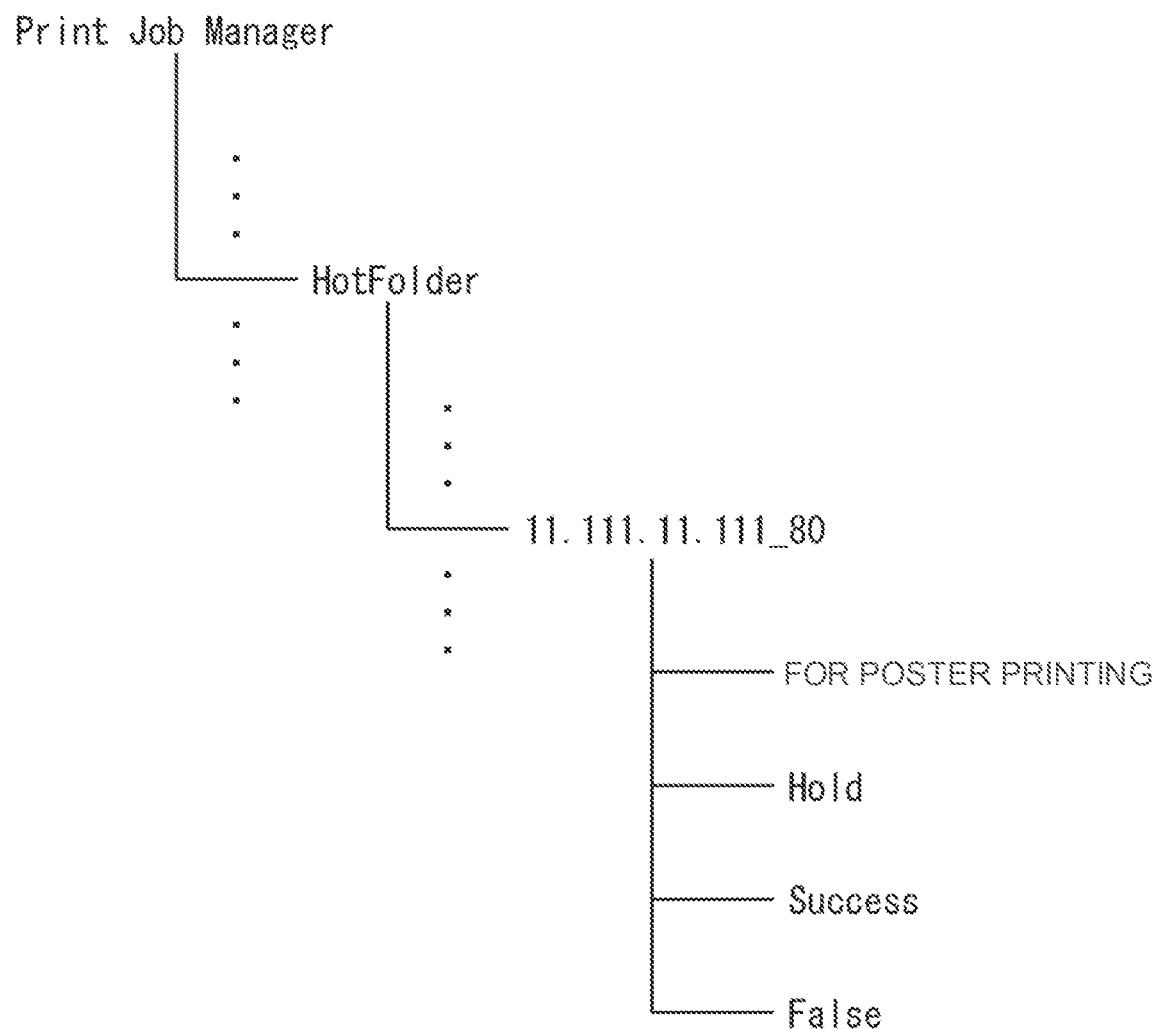
FIG. 7 is a diagram illustrating an example of a normal directory generated directly under the hot folder illustrated in FIG. 6.

FIG. 7 is a diagram illustrating an example of a normal directory generated directly under the hot folder illustrated in FIG. 6.

In FIG. 7, a directory with a name "FOR POSTER PRINTING" is generated as a normal directory directly under a hot folder with a folder name "11.111.11.111_80".

Next, the operation of the print job transmission device 30 when a file of job settings (hereinafter referred to as a "job setting file") will be described.

In a state where the print job transmission program 34a is running, the user of the print job transmission device 30 can instruct the print job transmission device 30 from the operator 31 to generate a job setting file under a specific hot folder. When instructed to generate a job setting file under a specific hot folder, the job setting determiner 35c of the print job transmission device 30 generates this job setting file at the instructed location.

The job setting determiner 35c of the print job transmission device 30 can be instructed to generate a job setting file directly under a specific hot folder, can be instructed to generate a job setting file directly under a specific job setting directory under a specific hot folder, or can be instructed to generate a job setting file directly under a normal directory under a specific hot folder.

Figure 8:
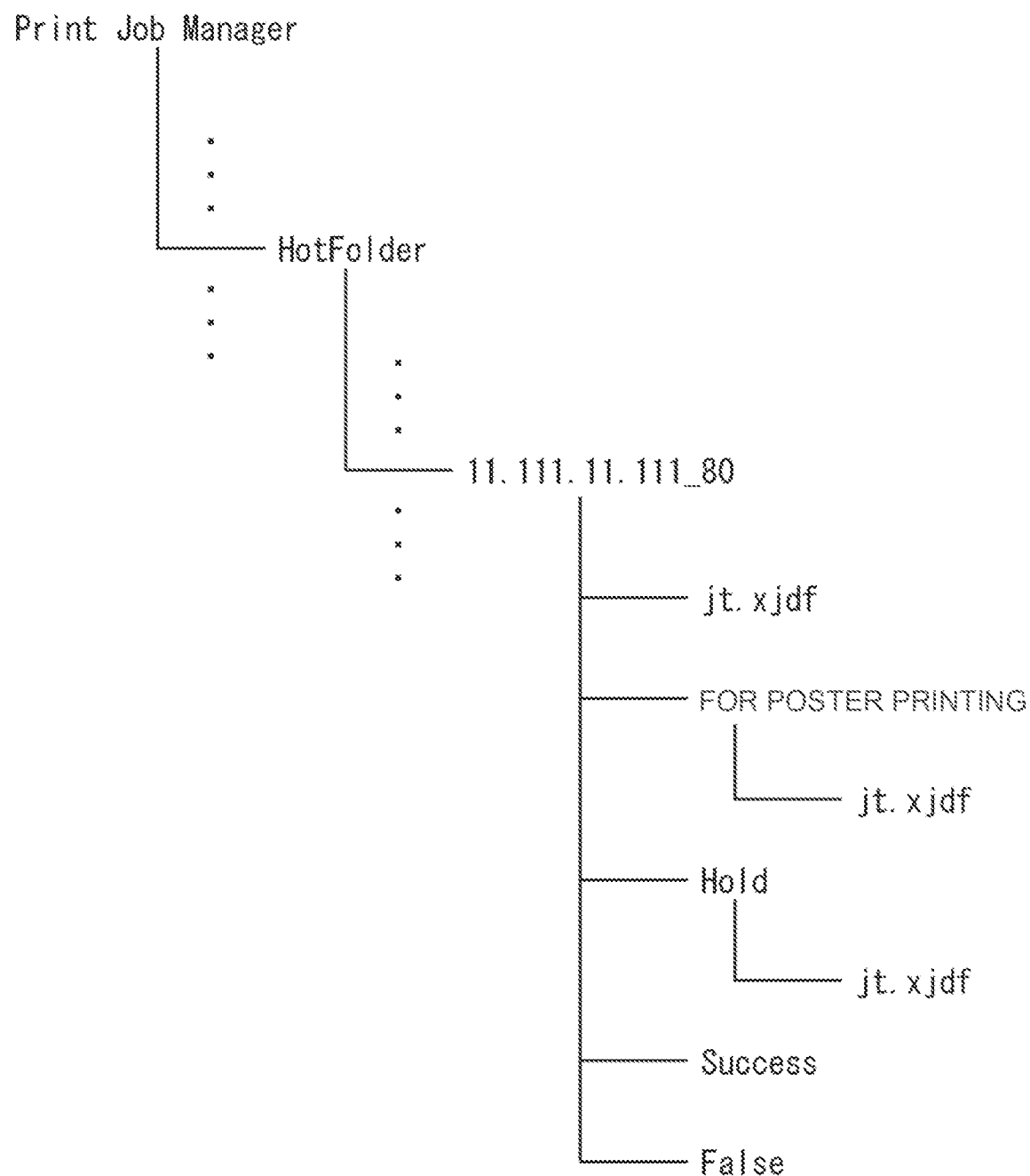
FIG. 8 is a diagram illustrating an example of a job setting file generated under the hot folder illustrated in FIG. 7.

FIG. 8 is a diagram illustrating an example of a job setting file generated under the hot folder illustrated in FIG. 7.

In FIG. 8, a job setting file with a file name "jt.xjdf" is generated as a job setting file directly under the hot folder with the folder name "11.111.11.111_80", directly under the directory with the name "FOR POSTER PRINTING" directly under the hot folder with the folder name "11.111.11.111_80", and directly under the Hold directory directly under the hot folder with the folder name "11.111.11.111_80", respectively.

Next, the operation of the print job transmission device 30 when a PDF file is placed under a hot folder will be described.

Figure 9:
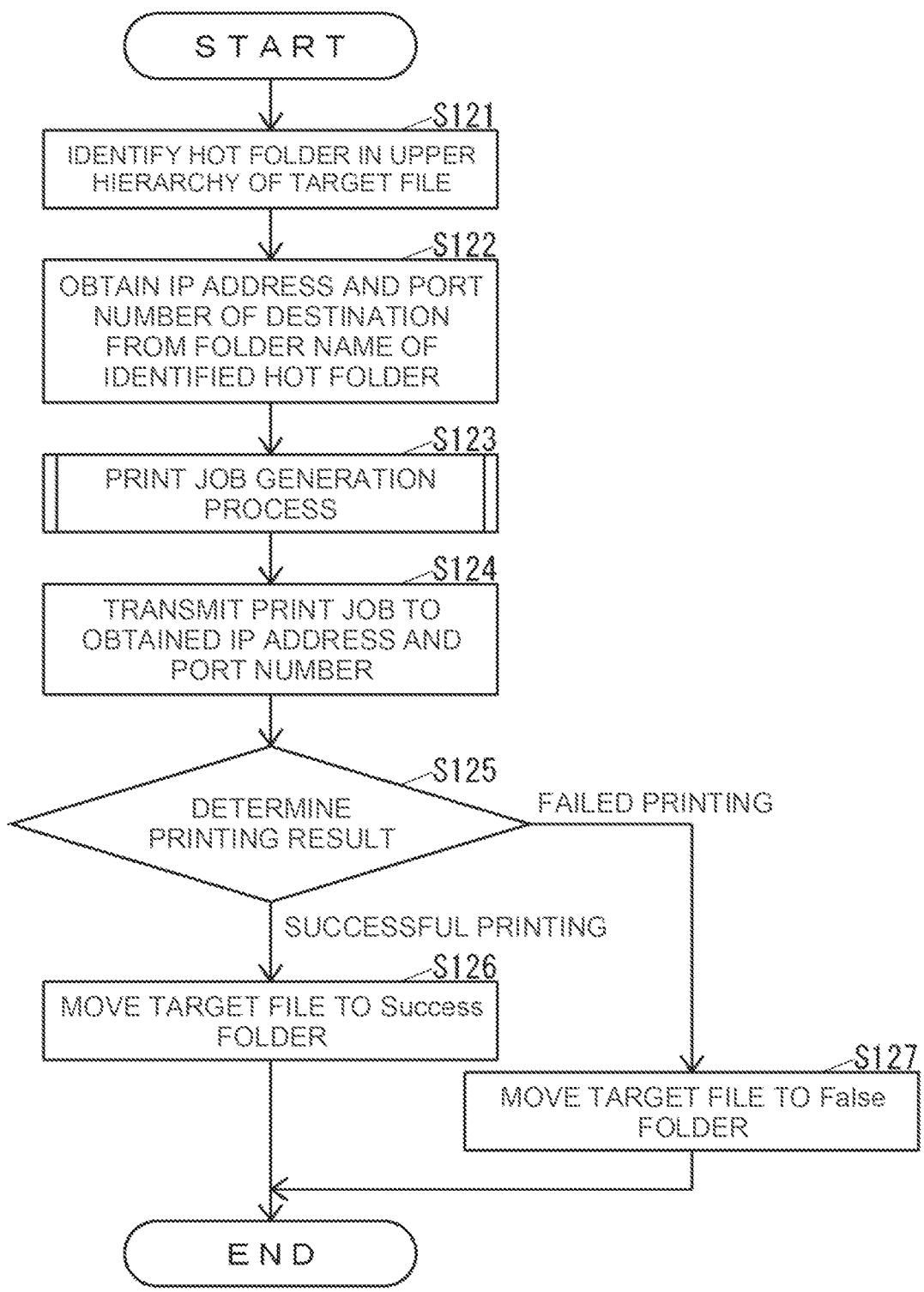
FIG. 9 is a flowchart of the operation of the print job transmission device illustrated in FIG. 3 in a case where a PDF file is placed under a hot folder.

FIG. 9 is a flowchart of the operation of the print job transmission device 30 when a PDF file is placed under a hot folder.

In a state where the print job transmission program 34a is running, the user of the print job transmission device 30 can place a PDF file under a hot folder by, for example, dragging and dropping the PDF file directly under one of the directories to the hot folder. Here, the user of the print job transmission device 30 can place the PDF file directly under the hot folder, or directly under the directory under the hot folder. Since the print job generator 35d monitors the hot folder as described above, when a PDF file is placed in a location under the hot folder and not under either the Success folder or the False folder, the controller 35 of the print job transmission device 30 executes the operation illustrated in FIG. 9.

As illustrated in FIG. 9, the print job transmitter 35e identifies a hot folder in the upper hierarchy of the PDF file that has been detected to be placed (hereinafter referred to as a "target file") (S121).

After the processing of S121, the print job transmitter 35e obtains the IP address and the port number of the image forming apparatus that is the destination of the print job based on the target file, from the folder name of the hot folder identified in S121, on the basis of a specific rule (S122). The "specific rule" in S122 is the same as the "specific rule" in S102. Here, the specific rule is, for example, the rule "IP address_port number". For example, when the folder name of the hot folder identified in S121 is "11.111.11.111_80", the print job transmitter 35e obtains in S122, "11.111.11.111" and "80" as the IP address and port number of the image forming apparatus that is the destination, respectively.

After the processing of S122, the controller 35 executes a print job generation process for generating a print job on the basis of the target file (S123).

Figure 10:
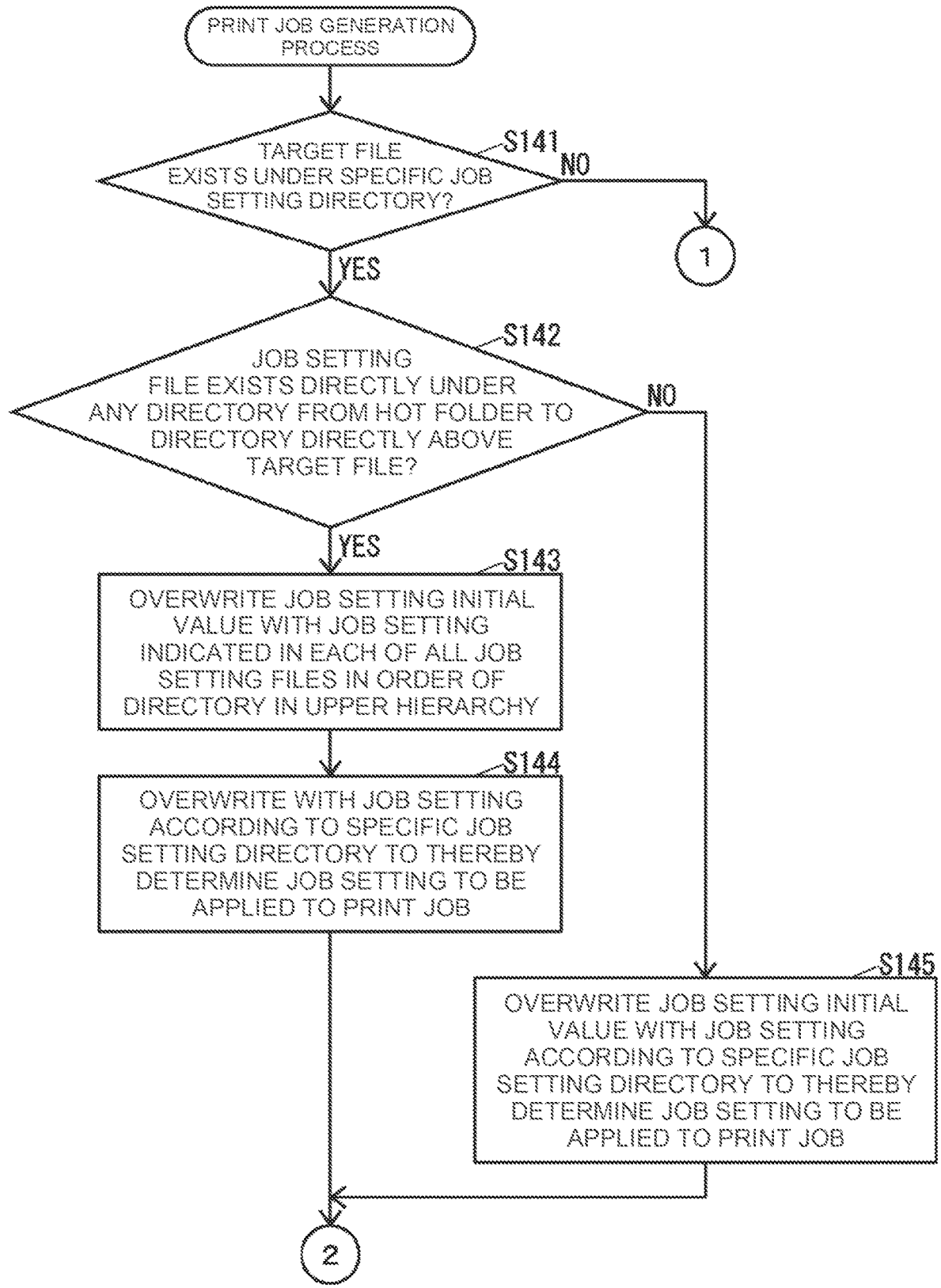
FIG. 10 is a flowchart of a part of a print job generation process illustrated in FIG. 9.
Figure 11:
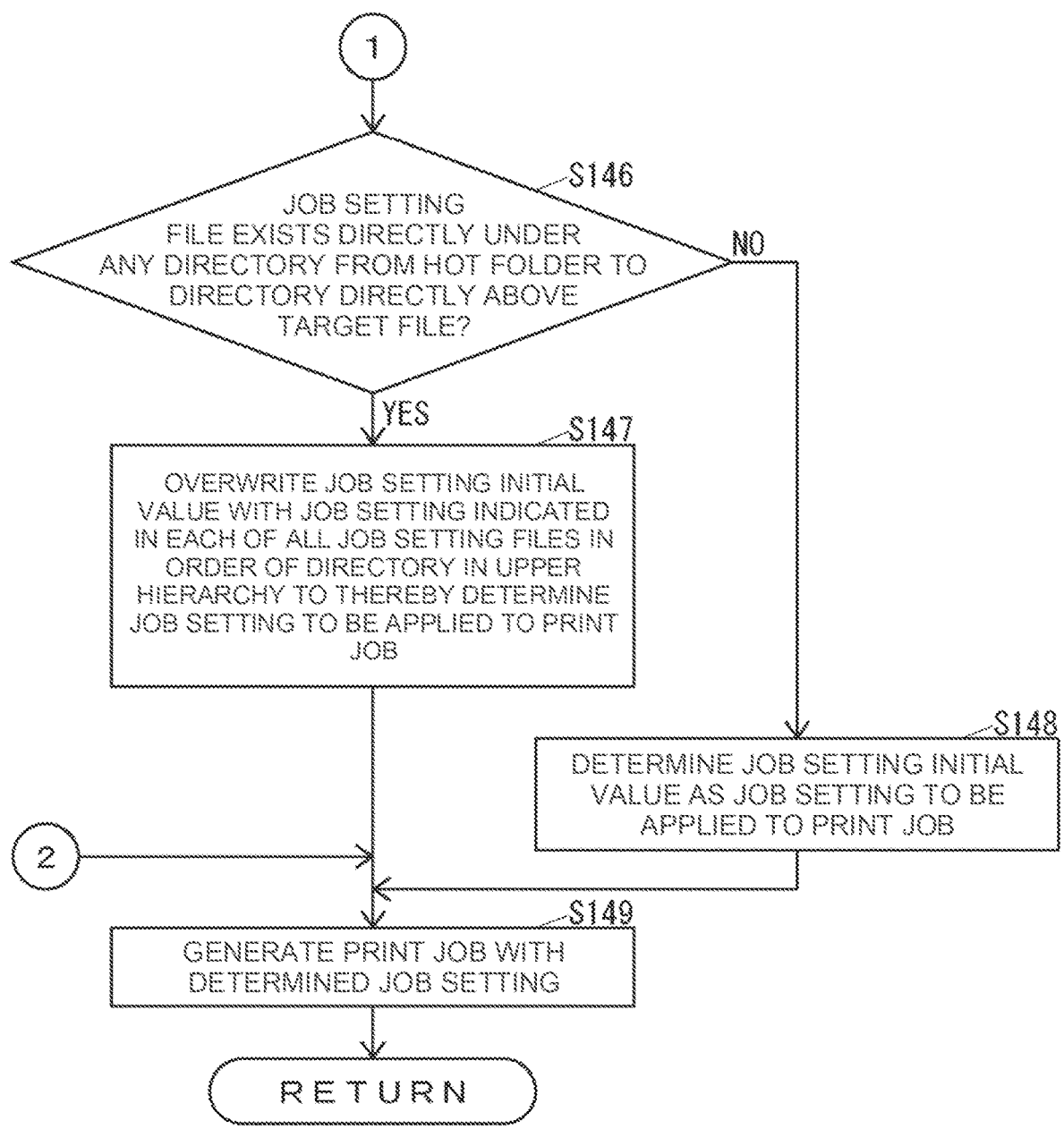
FIG. 11 is a flowchart following the flowchart of FIG. 10.

FIG. 10 is a flowchart of a part of a print job generation process illustrated in FIG. 9. FIG. 11 is a flowchart following the flowchart of FIG. 10.

As illustrated in FIGS. 10 and 11, the job setting determiner 35c determines whether the target file exists under the specific job setting directory (S141). Here, the job setting determiner 35c is capable of identifying the directory with a name indicated in the specific job setting directory name information 34d as the specific job setting directory.

When determining in S141 that the target file exists under the specific job setting directory, the job setting determiner 35c determines whether the job setting file exists directly under any directory from the hot folder identified in S121 to the directory directly above the target file in the hierarchical structure of directories (S142). When a job setting file exists directly under any directory in either the directory directly above the target file and any directory in the upper hierarchy of this directory up to the hot folder identified in S121, the job setting determiner 35c determines that the job setting file exists directly under any directory from the hot folder identified in S121 to the directory directly above the target file. On the other hand, when a job setting file does not exist directly under any directory in either the directory directly above the target file and any directory in the upper hierarchy of this directory up to the hot folder identified in S121, the job setting determiner 35c determines that a job setting file does not exist directly under any directory from the hot folder identified in S121 to the directory directly above the target file.

When determining in S142 that a job setting file exists directly under any directory from the hot folder identified in S121 to the directory directly above the target file in the hierarchical structure of directories, the job setting determiner 35c overwrites the job setting initial value indicated in the job setting initial value information 34c with the job setting indicated in each of all the job setting files determined to exist in S142, in order of directories in the upper hierarchy (S143).

After the processing of S143, the job setting determiner 35c overwrites the job setting generated in S143 with the job setting according to the specific job setting directory of the upper hierarchy of the target file, to thereby determine the job setting to be applied to the print job based on the target file (S144). Here, the job setting determiner 35c identifies the job setting that is associated with the name of the specific job setting directory in the specific job setting directory name information 34d, as the job setting corresponding to this specific job setting directory.

When determining in S142 that a job setting file does not exist directly under any directory from the hot folder identified in S121 to the directory directly above the target file in the hierarchical structure of directories, the job setting determiner 35c overwrites the job setting initial value indicated in the job setting initial value information 34c with a job setting according to a specific job setting directory in the upper hierarchy of the target file, to thereby determine a job setting to be applied to the print job based on the target file (S145). Here, the job setting determiner 35c identifies the job setting that is associated with the name of the specific job setting directory in the specific job setting directory name information 34d, as the job setting corresponding to this specific job setting directory.

When determining in S141 that the target file does not exist under the specific job setting directory, in the same manner as the processing of S142, the job setting determiner 35c determines whether the job setting file exists directly under any directory from the hot folder identified in S121 to the directory directly above the target file in the hierarchical structure of directories (S146).

When determining in S146 that a job setting file exists directly under any directory from the hot folder identified in S121 to the directory directly above the target file in the hierarchical structure of directories, the job setting determiner 35c overwrites the job setting initial value indicated in the job setting initial value information 34c with the job setting indicated in each of all the job setting files determined to exist in S146, in order of directories in the upper hierarchy, to thereby determine a job setting to be applied to the print job based on the target file (S147).

When determining in S146 that a job setting file does not exist directly under any directory from the hot folder identified in S121 to the directory directly above the target file in the hierarchical structure of directories, the job setting determiner 35c determines the job setting initial value indicated in the job setting initial value information 34c as a job setting to be applied to the print job based on the target file (S148).

After the processing of S144, S145, S147, or S148, the print job generator 35d generates a print job to which the job setting determined in S144, S145, S147, or S148 is applied, on the basis of the target file (S149), and ends the print job generation process illustrated in FIGS. 10 and 11.

FIG. 12A is a table illustrating an example of a job setting initial value indicated in job setting initial value information 34c. FIG. 12B is a table illustrating an example of a job setting indicated in a job setting file with a file name "jt.xjdf" directly under a hot folder with a folder name "11.111.11.111_80" illustrated in FIG. 8. FIG. 12C is a table illustrating an example of a job setting indicated in a job setting file with a file name "jt.xjdf" directly under a directory with a name of "FOR POSTER PRINTING" illustrated in FIG. 8. FIG. 12D is a table illustrating an example of a job setting indicated in a job setting file with a file name "jt.xjdf" directly under a Hold directory illustrated in FIG. 8.

FIG. 13A is a table illustrating an example of the job setting determined in S144. FIG. 13B is a table illustrating an example of the job setting determined in S147.

When the job setting initial values indicated in the job setting initial value information 34c are those illustrated in FIG. 12A and the job settings indicated in the job setting files indicated in FIG. 8 are those illustrated in FIGS. 12B to 12D, respectively, the print job generator 35d overwrites the initial values illustrated in FIG. 12A with the job setting illustrated in FIG. 12B and the job setting illustrated in FIG. 12D in order (S143), and further overwrites ON in the Hold setting, to thereby determine the job setting illustrated in FIG. 13A as a job setting to be applied to a print job based on a PDF file placed directly under the Hold directory illustrated in FIG. 8 (S144).

When the job setting initial values indicated in the job setting initial value information 34c are those illustrated in FIG. 12A and the job settings indicated in the job setting files indicated in FIG. 8 are those illustrated in FIGS. 12B to 12D, respectively, the print job generator 35d overwrites the initial values illustrated in FIG. 12A with the job setting illustrated in FIG. 12B and the job setting illustrated in FIG. 12C in order, to thereby determine the job setting illustrated in FIG. 13B as a job setting to be applied to a print job based on a PDF file placed directly under the directory with a name "FOR POSTER PRINTING" illustrated in FIG. 8 (S147).

As illustrated in FIG. 9, after the print job generation process of S123, the print job transmitter 35e transmits the print job generated in S123 to the port identified by the port number obtained in S122 of the image forming apparatus identified by the IP address obtained in S122 (S124). Accordingly, the controller 26 of the image forming apparatus to which the print job is transmitted from the print job transmission device 30 executes printing according to the print job transmitted from the print job transmission device 30 by the printer 23 in accordance with the job setting applied to the print job, and returns the print result to the print job transmission device 30 via the communicator 24.

After the processing of S124, the print job transmitter 35e determines the print result of the print job transmitted in S124 (S125). For example, when receiving a print result indicating a successful printing from the image forming apparatus that has transmitted the print job in S124, the print job transmitter 35e determines that the print result of the print job transmitted in S124 is a successful printing. In addition, when receiving a print result indicating a failed printing from the image forming apparatus that has transmitted the print job in S124, the print job transmitter 35e determines that the print result of the print job transmitted in S124 is a failed printing.

When determining in S125 that the print result of the print job sent in S124 is a successful printing, the print job transmitter 35e moves the target file to the Success folder directly under the hot folder identified in S121 (S126), and ends the operation illustrated in FIG. 9.

When determining in S125 that the print result of the print job sent in S124 is a failed printing, the print job transmitter 35e moves the target file to the False folder directly under the hot folder identified in S121 (S127), and ends the operation illustrated in FIG. 9.

In the above, the method for generating a print job with the use of a hot folder is described. However, the print job generator 35d can also generate a print job via the print job transmission program 34a by a method other than using a hot folder to generate a print job. In addition, the controller 35 can also perform a function other than generating a print job by executing the print job transmission program 34a. For example, the controller 35 can check the state of the image forming apparatus by executing the print job transmission program 34a.

As described above, the print job transmission device 30 obtains the IP address and the port number of the destination of a print job based on a PDF file, from the folder name of a hot folder in the upper hierarchy of the PDF file, on the basis of the specific rule (S121-S122). Thus, the destination of the print job can be associated with the hot folder by the folder name of the hot folder in the upper hierarchy of the PDF file, and as a result, the work of associating the destination of the print job with the hot folder can be facilitated.

The print job transmission device 30 generates the folder name of the hot folder on the basis of the IP address and port number used in communication with the destination, in accordance with the specific rule (S102), and thus the generation of the hot folder can be facilitated.

The print job transmission device 30 overwrites the job setting indicated in a job setting file that exists from directly under the hot folder in the upper hierarchy of a PDF file to directly under a directory directly above this PDF file in the hierarchical structure of directories, in order of directories in the upper hierarchy, to thereby determine the job setting to be applied to the print job based on this PDF file (S143-S144 or S147). Therefore, even if the user does not enter the job setting to be applied to the print job each time, in the hierarchical structure of directories, by placing the job setting file directly under any directory from the hot folder in the upper hierarchy of the PDF file to the directory directly above this PDF file, the job setting can be applied to the print job based on this PDF file. As a result, the application of the job setting to the print job can be facilitated.

When a PDF file exists under a specific job setting directory, the print job transmission device 30 determines the job setting associated with the name of this specific job setting directory as the job setting to be applied to the print job based on this PDF file (S144 or S145). Therefore, even if the user does not enter the job setting to be applied to the print job each time, by placing the PDF file under the specific job setting directory, the job setting can be applied to the print job based on this PDF file. As a result, the application of the job setting to the print job can be facilitated.

The specific format file of the present disclosure is a PDF file in the present embodiment. However, the specific format files of the present disclosure may include files with a specific file format other than PDF files, in addition to or instead of PDF files.

What is claimed is:

1. A print job transmission device comprising:
a print job generator to generate a print job on a basis of a specific format file as a file with a specific file format that exists under a hot folder;
a print job transmitter to transmit the print job generated by the print job generator; and
a job setting determiner to determine a job setting as a setting of the print job to be applied to the print job,
wherein the print job transmitter obtains an IP address and a port number of a destination of the print job based on the specific format file from a folder name of the hot folder in an upper hierarchy of the specific format file, on a basis of a specific rule,
wherein the print job generator generates the print job to which the job setting determined by the job setting determiner is applied, and
wherein the job setting determiner overwrites the job setting indicated in a job setting file as a file of the job setting that exists from directly under the hot folder in an upper hierarchy of the specific format file to directly under a directory directly above this specific format file in a hierarchical structure of directories, in order of directories in an upper hierarchy, to thereby determine the job setting to be applied to the print job based on this specific format file.

2. The print job transmission device according to claim 1, comprising a hot folder generator to generate the hot folder,
wherein the hot folder generator generates the folder name of the hot folder on a basis of the IP address and the port number used in communication with the destination, in accordance with the specific rule.

3. A print job transmission device comprising:
a print job generator to generate a print job on a basis of a specific format file as a file with a specific file format that exists under a hot folder;
a print job transmitter to transmit the print job generated by the print job generator; and
a job setting determiner to determine a job setting as a setting of the print job to be applied to the print job,
wherein the print job transmitter obtains an IP address and a port number of a destination of the print job based on the specific format file from a folder name of the hot folder in an upper hierarchy of the specific format file, on a basis of a specific rule,
wherein the print job generator generates the print job to which the job setting determined by the job setting determiner is applied, and
wherein when the specific format file exists under a specific job setting directory which is a directory for setting the job that is specific and whose name is associated with the job setting, the job setting determiner determines the job setting associated with the name of the specific job setting directory as the job setting to be applied to the print job based on the specific format file.

4. The print job transmission device according to claim 3, comprising a hot folder generator to generate the hot folder,
wherein the hot folder generator generates the folder name of the hot folder on a basis of the IP address and the port number used in communication with the destination, in accordance with the specific rule.

5. A computer-readable non-transitory recording medium storing a print job transmission program causing a computer to implement:
a print job generator to generate a print job on a basis of a specific format file as a file with a specific file format that exists under a hot folder;
a print job transmitter to transmit the print job generated by the print job generator; and
a job setting determiner to determine a job setting as a setting of the print job to be applied to the print job,
wherein the print job transmitter obtains an IP address and a port number of a destination of the print job based on the specific format file from a folder name of the hot folder in an upper hierarchy of the specific format file, on a basis of a specific rule,
wherein the print job generator generates the print job to which the job setting determined by the job setting determiner is applied, and
wherein the job setting determiner overwrites the job setting indicated in a job setting file as a file of the job setting that exists from directly under the hot folder in an upper hierarchy of the specific format file to directly under a directory directly above this specific format file in a hierarchical structure of directories, in order of directories in an upper hierarchy, to thereby determine the job setting to be applied to the print job based on this specific format file.

6. A computer-readable non-transitory recording medium storing a print job transmission program causing a computer to implement:
a print job generator to generate a print job on a basis of a specific format file as a file with a specific file format that exists under a hot folder;
a print job transmitter to transmit the print job generated by the print job generator; and
a job setting determiner to determine a job setting as a setting of the print job to be applied to the print job,
wherein the print job transmitter obtains an IP address and a port number of a destination of the print job based on the specific format file from a folder name of the hot folder in an upper hierarchy of the specific format file, on a basis of a specific rule,
wherein the print job generator generates the print job to which the job setting determined by the job setting determiner is applied, and
wherein when the specific format file exists under a specific job setting directory which is a directory for setting the job that is specific and whose name is associated with the job setting, the job setting determiner determines the job setting associated with the name of the specific job setting directory as the job setting to be applied to the print job based on the specific format file.

* * * * *